United States Patent
Kawano et al.

(10) Patent No.: US 7,276,461 B2
(45) Date of Patent: Oct. 2, 2007

(54) DIELECTRIC CERAMIC COMPOSITION, METHOD OF MANUFACTURING THE SAME, AND DIELECTRIC CERAMICS AND LAMINATED CERAMIC PART USING THE SAME

(75) Inventors: Takafumi Kawano, Ube (JP); Koichi Fukuda, Ube (JP)

(73) Assignee: UBE Industries, Ltd., Yamaguchi (JP)

( * ) Notice: Subject to any disclaimer, the term of this patent is extended or adjusted under 35 U.S.C. 154(b) by 155 days.

(21) Appl. No.: 10/556,374

(22) PCT Filed: May 19, 2004

(86) PCT No.: PCT/JP2004/006735

§ 371 (c)(1),
(2), (4) Date: Nov. 10, 2005

(87) PCT Pub. No.: WO2004/103929

PCT Pub. Date: Dec. 2, 2004

(65) Prior Publication Data

US 2006/0234851 A1 Oct. 19, 2006

(30) Foreign Application Priority Data

May 20, 2003 (JP) .............................. 2003-142148
May 20, 2003 (JP) .............................. 2003-142149

(51) Int. Cl.
C04B 35/462 (2006.01)
(52) U.S. Cl. .................. 501/134; 428/472; 428/701
(58) Field of Classification Search ............... 501/134, 501/135, 136; 428/472, 701

See application file for complete search history.

(56) References Cited

U.S. PATENT DOCUMENTS

| 5,723,395 A * | 3/1998 | Suzuki et al. ................ 501/134 |
| 5,916,834 A * | 6/1999 | Terashi et al. .............. 501/135 |
| 7,138,352 B2 * | 11/2006 | Lee et al. ..................... 501/136 |
| 2003/0104917 A1 * | 6/2003 | Kawano et al. ............... 501/32 |

FOREIGN PATENT DOCUMENTS

| JP | 6-132621 A | 5/1994 |
| JP | 9-20555 A | 1/1997 |
| JP | 10-101416 A | 4/1998 |
| JP | 10-330161 A | 12/1998 |
| JP | 2003-221274 A | 8/2003 |
| JP | 2004-26543 A | 1/2004 |

* cited by examiner

*Primary Examiner*—Karl Group
(74) *Attorney, Agent, or Firm*—Frommer Lawrence & Haug LLP; Ronald R. Santucci (57) ABSTRACT

A dielectric ceramic composition having a relative dielectric constant $\epsilon_r$ of 15-25 allowing formation of a laminated ceramic part having an appropriate size, capable of being sintered at a temperature lower than 800-1000° C. allowing incorporation and lamination of low resistance conductor of Cu or Ag through simultaneous sintering, and having a low dielectric loss tan δ (high Q-value) and a temperature coefficient $\tau_f$ of resonant frequency has an absolute value not larger than 50 ppm/° C. The dielectric ceramic composition contains 3-30 parts by weight of lead-free low melting point glass containing 50 to 75 wt % of ZnO, 5 to 30 wt % of $B_2O_3$, 6 to 15 wt % of $SiO_2$, 0.5 to 5 wt % of $Al_2O_3$, and 3 to 10 wt % of BaO, based on 100 parts by weight of major component expressed by a general formula of $x'Zn_2TiO_4$-$(1-x'-y')ZnTiO_3$-$y'TiO_2$ where $0.15<x'<0.8$ and $0 \leq y' \leq 0.2$

8 Claims, 2 Drawing Sheets

DIELECTRIC CERAMIC COMPOSITION, METHOD OF MANUFACTURING THE SAME, AND DIELECTRIC CERAMICS AND LAMINATED CERAMIC PART USING THE SAME

This application is a 371 of PCT/JP2004/006735 filed on May 19, 2004, published on Dec. 2, 2004 under publication number WO 2004/103929 A1 which claims priority benefits from Japanese Patent Application Number 2003-142148 filed May 20, 2003 and Japanese Patent Application Number 2003-142149 filed May 20, 2003.

TECHNICAL FIELD

The present invention relates to dielectric ceramics that have a relative dielectric constant of about 15 to 25, and a small absolute value in temperature coefficient $\tau_f$ of resonant frequency, that can be sintered simultaneously with Au, Ag, Cu or the like as a low resistant conductor, and that have less dielectric loss (a large Q-value) suitable for laminated ceramic parts, a composition to obtain the dielectric ceramics, a method of manufacturing the same, and a laminated ceramic part using the same, such as a laminated dielectric condenser, an LC filter, or the like.

In particular, the present invention relates to a dielectric ceramic composition comprising a major component containing $Zn_2TiO_4$ and $ZnTiO_3$ and further $TiO_2$ if necessary, and a glass component, a method of manufacturing the same, and dielectric ceramics and a laminated ceramic part using the same, and further relates to a dielectric ceramic composition comprising a major component containing $Zn_2TiO_4$, $ZnTiO_3$ and $Al_2O_3$ and further $TiO_2$ if necessary, and a glass component, a method of manufacturing the same, and dielectric ceramics and a laminated ceramic part using the same.

BACKGROUND ART

In recent years, a progress of integration of microwave circuits has involved demands for a dielectric resonator having a small size, less dielectric loss (tan δ), and stable dielectric characteristics. There hence has been a growing market of laminated chip parts internally having laminated electrode conductors for dielectric resonator parts. Inner conductors of these laminated chip parts have been using noble metal such as Au, Pt, Pd, or the like. From the view point of cost reduction, however, conductor materials have been replaced with Ag or Cu or alloy containing, as a major component, Ag or Cu, which is relatively cheaper than the conductor materials described above. Particularly, Ag or alloy containing Ag as a major component is strongly demanded, since it has a low resistance to a direct current and therefore is advantageous for improvement in the Q-characteristic of the dielectric resonator, etc. However, Ag or alloy containing Ag as a major component has a low melting point of about 960° C. and necessitates a dielectric material which can be sintered at a temperature lower than the melting point.

In case of forming a dielectric filter with use of a dielectric resonator, characteristics which are requested for a dielectric material are: (1) a small absolute value of the temperature coefficient $\tau_f$ of the resonant frequency of a dielectric material to reduce, as much as possible, characteristic changes caused by temperature changes; and (2) a high Q-value of a dielectric material to reduce insertion loss, as much as possible, as requested for a dielectric filter. Further, with respect to a range near a micro wave used by a cellular phone or the like, the length of a resonator is limited by a relative dielectric constant $\epsilon_r$ of the dielectric material. Therefore, a high relative dielectric constant $\epsilon_r$ is requested for downsizing of elements. In this case, the length of the resonator is determined with reference to the wavelength of a used electromagnetic wave. The wavelength λ of the electromagnetic wave propagating through a dielectric material having a relative dielectric constant $\epsilon_r$ is expressed by $\lambda=\lambda_0/(\epsilon_r)^{1/2}$ wherein the wavelength of the electromagnetic wave propagating through vacuum is $\lambda_0$.

Accordingly, elements can be downsized more as the dielectric constant of the dielectric material used increases. However, if the element is too small, required processing accuracy is severe. Therefore, actual processing accuracy deteriorates and is easily affected by printing accuracy of electrodes. For some purposes, the relative dielectric constant $\epsilon_r$ is required to be within a proper range (e.g., about 10 to 40 or more preferably about 15 to 25) so that elements might not be too small.

To satisfy these requirements, known dielectric materials capable of preparing a dielectric member at a temperature not higher than 1000° C. may be a material in which inorganic dielectric particles are dispersed in resin (JP(A)-6-132621), glass ceramics consisting of a composite material of $BaO$—$TiO_2$—$Nd_2O_3$-based ceramics and glass (JP(A)-10-330161, page 3, paragraph [0005] and Table 1), and the like. Also known is a dielectric ceramics which contain $TiO_2$ and $ZnO$ and further contain $B_2O_3$-based glass (JP(B)-3103296).

However, the element disclosed in the JP(A)-6-132621 has an allowable temperature limit of about 400° C. and causes a problem that multi-lamination and fine wiring cannot be carried out by simultaneous sintering with Ag or the like used as a wiring conductor.

The glass ceramics material disclosed in JP(A)-10-330161 has a problem as follows. The relative dielectric constant $\epsilon_r$ of this material is greater than 40 so that the element becomes too small. Consequently, required processing accuracy is so severe that actual processing accuracy deteriorates and is easily affected by printing accuracy of electrodes.

Further, the composition disclosed in the JP(B)-3103296 has a relative dielectric constant $\epsilon_r$ as high as about 25 to 70, as can be seen from Examples. The temperature coefficient of a dielectric characteristic varies greatly by the composition, so that the absolute value thereof exceeds 700 ppm/° C. in some cases. In order to provide a dielectric part for a high frequency, such a material has been demanded that has a proper relative dielectric constant, a small dependency of the dielectric characteristic on temperature, and a high Q-value.

Further, the dielectric characteristic of dielectric ceramics obtained by sintering a dielectric ceramic composition usually changes or has variants due to changes in sintering temperature and in composition. These changes and variants of the characteristic due to changes in sintering temperature and in composition cause deterioration of the yield in mass production.

DISCLOSURE OF THE INVENTION

An object of the present invention is to provide dielectric ceramics that have a relative dielectric constant of about 10 to 40 or more preferably about 15 to 25 so that laminated ceramic parts and the like can be formed into appropriate sizes, that allows sintering at a temperature of 800 to 1000° C. which enables internal packaging and multi-lamination of a low resistance conductor such as Cu, Ag or the like based on simultaneous sintering, that causes less dielectric loss tan δ (a high Q-value), and that has an absolute value in temperature coefficient $\tau_f$ of resonant frequency of 50 ppm/°C. or less, a dielectric ceramic composition to obtain such dielectric ceramics or particularly a dielectric ceramic composition that causes less characteristic changes and variants caused by changes in sintering temperature and causes less changes in composition at the time of sintering, and a method of manufacturing the same. Another object of the present invention is to provide a laminated ceramic part such as a laminated ceramic condenser or an LC filter that has a dielectric layer made of such dielectric ceramics as described above and an inner electrode containing Cu or Ag as a major component.

(1) First Embodiment of the Present Invention

The present inventors have eagerly made studies to solve the above problems, and have found the following, as a result. That is, if glass containing at least ZnO, $B_2O_3$, $SiO_2$, $Al_2O_3$, and BaO is added to a mixture containing $ZnTiO_3$ and $Zn_2TiO_4$, and further $TiO_2$ if necessary, $\epsilon_r$ within a range of 15 to 25 and small dielectric loss tan δ (a high Q-value) can be obtained without changing the generation phase ratio between $ZnTiO_3$, $Zn_2TiO_4$ and $TiO_2$ even after sintering at 800 to 1000° C. By using glass containing ZnO, dissolution of ZnO components into glass from $ZnTiO_3$ and $Zn_2TiO_4$ can be suppressed as much as possible, and therefore, changes in dielectric characteristic caused by changes in the composition can be suppressed. Accordingly, lamination and fine pattern wiring are possible with use of Cu, Ag and the like as wiring conductors.

The present invention relates to a dielectric ceramic composition containing 100 parts by weight of a major component expressed by a general formula of $x'Zn_2TiO_4$-$(1-x'-y')ZnTiO_3$-$y'TiO_2$ where x' satisfies 0.15<x'<0.8 and y' satisfies 0≦y'≦0.2; and 3 to 30 parts by weight of lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %.

The present invention also relates to dielectric ceramics containing crystalline phases of $Zn_2TiO_4$, $ZnTiO_3$ and $TiO_2$ (where the $TiO_2$ phase may be omitted, which applies also to the following cases) and a glass phase, which are obtained by sintering the dielectric ceramic composition.

Further, the present invention relates to a method of manufacturing the dielectric ceramic composition, comprising the steps of mixing powder of raw material of ZnO and powder of raw material of $TiO_2$ and calcining them to obtain ceramic powder containing $Zn_2TiO_4$, $ZnTiO_3$ and $TiO_2$ (where the content of $TiO_2$ may be zero); and mixing the ceramic powder with lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %.

Further, the present invention relates to a laminated ceramic part comprising plural dielectric layers; an internal electrode formed between the dielectric layers; and an external electrode electrically connected to the internal electrode, wherein the dielectric layers are constituted by dielectric ceramics obtained by sintering the dielectric ceramic composition, and the internal electrode is made of elemental Cu or elemental Ag or alloy material containing Cu or Ag as a major component.

(2) Second Embodiment of the Present Invention

The present inventors also have eagerly made studies to solve the above problems, and have found the following, as a result. That is, if glass containing at least ZnO and $B_2O_3$ is added to a mixture containing $ZnTiO_3$, $Zn_2TiO_4$ and $Al_2O_3$, and further $TiO_2$ if necessary, $\epsilon_r$ within a preferable range and small dielectric loss tan δ (a high Q-value) can be obtained without changing the generation phase ratio between $ZnTiO_3$, $Zn_2TiO_4$, $TiO_2$ and $Al_2O_3$ even after sintering at 800 to 1000° C. By using glass containing ZnO, dissolution of ZnO components into glass from $ZnTiO_3$ and $Zn_2TiO_4$ can be suppressed as much as possible, and therefore, changes in dielectric characteristic caused by changes in the composition can be suppressed. Accordingly, lamination and fine pattern wiring are possible with use of Cu, Ag and the like as wiring conductors.

The present invention relates to a dielectric ceramic composition containing 100 parts by weight of a major component expressed by a general formula of $xZn_2TiO_4$-$yZnTiO_3$-$zTiO_2$-$wAl_2O_3$ where x satisfies 0.15<x<1.0, y satisfies 0<y<0.85, z satisfies 0≦z≦0.2, w satisfies 0<w≦0.2, and x+y+z+w=1 is satisfied; and 3 to 30 parts by weight of lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %. In a preferred embodiment of the dielectric ceramic composition of the present invention, x satisfies 0.15<x<0.99, y satisfies 0.05<y<0.85, w satisfies 0.005<w≦0.2.

The present invention also relates to dielectric ceramics containing crystalline phases of $Zn_2TiO_4$, $ZnTiO_3$, $TiO_2$ and $Al_2O_3$ (where the $TiO_2$ phase may be omitted) and a glass phase, which are obtained by sintering the dielectric ceramic composition.

Further, the present invention relates to a method of manufacturing the dielectric ceramic composition, comprising the steps of mixing powder of raw material of ZnO and powder of raw material of $TiO_2$ and calcining them to obtain ceramic powder containing $Zn_2TiO_4$, $ZnTiO_3$ and $TiO_2$ (where the content of $TiO_2$ may be zero); and mixing the ceramic powder with $Al_2O_3$ and lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %.

Further, the present invention relates to a laminated ceramic part comprising plural dielectric layers; an internal electrode formed between the dielectric layers; and an external electrode electrically connected to the internal electrode, wherein the dielectric layers are constituted by dielectric ceramics obtained by sintering the dielectric ceramic composition, and the internal electrode is made of elemental Cu or elemental Ag or alloy material containing Cu or Ag as a major component.

A dielectric ceramic composition of the present invention comprises a crystalline component containing $Zn_2TiO_4$ and $ZnTiO_3$, and $TiO_2$ as an optional component, and a specific glass component. Therefore, sintering is possible at a temperature of 1000° C. or lower. The relative dielectric constant $\epsilon_r$ of dielectric ceramics obtained by sintering the dielectric ceramic composition can be about 15 to 25. The dielectric loss thereof can be small. The absolute value of the temperature coefficient of resonant frequency thereof can be 50 ppm/° C. or lower. As a result, it is possible to provide a laminated ceramic part which has an internal electrode made of elemental Cu, elemental Ag, or alloy material containing Cu or Ag as a major component.

Another dielectric ceramic composition of the present invention comprises a crystalline component containing $Zn_2TiO_4$, $ZnTiO_3$ $Al_2O_3$, and $TiO_2$ as an optional component, and a specific glass component. Therefore, sintering is possible at a temperature of 1000° C. or lower. The relative dielectric constant $\epsilon_r$ of dielectric ceramics obtained by sintering the dielectric ceramic composition can be about 10 to 40, preferably about 15 to 25. The dielectric loss thereof can be small. The absolute value of the temperature coefficient of resonant frequency thereof can be 50 ppm/° C. or lower. Further, it is possible to provide a dielectric ceramic composition in which characteristics as described above are less changed depending on the sintering temperature. As a result, it is possible to provide a laminated ceramic part which has an internal electrode made of elemental Cu, elemental Ag, or alloy material containing Cu or Ag as a major component.

BEST MODE FOR CARRYING OUT THE INVENTION (1) First Embodiment of the Present Invention A dielectric ceramic composition according to the first embodiment of the present invention will now be described specifically.

The composition according to the present invention is a dielectric ceramic composition which contains a major component containing $Zn_2TiO_4$ and $ZnTiO_3$, and $TiO_2$ as an optional component, and a glass component. The major component is expressed by a general formula of x'$Zn_2TiO_4$-(1-x'-y')$ZnTiO_3$-y'$TiO_2$ where x' is within a range of 0.15<x'<0.8 and y' is within a range of 0≦y'≦0.2. The glass component is lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %. The dielectric ceramic composition of the present invention contains the glass component of 3 to 30 parts by weight relative to the main component of 100 parts by weight.

In the composition described above, x' should preferably be greater than 0.15 and smaller than 0.8. Where x' is 0.15 or less or 0.8 or more, the absolute value of $\tau_f$ undesirably exceeds 50 ppm/° C.

In addition, in the above composition, y' should preferably be within a range of 0 to 0.2. Since $TiO_2$ is contained, the specific dielectric constant tends to increase slightly. However, in the composition having y' of 0.2 or less, the effects which the present invention aims at can be obtained. If y' is greater than 0.2, $\tau_f$ exceeds +50 ppm/° C. undesirably.

In the dielectric ceramic composition of the present invention, the amount of the glass component should preferably be within a range of 3 to 30 parts by weight with respect to 100 parts by weight of the major component which constitutes ceramic base material. In case where the amount of the glass component is less than 3 parts by weight, the sintering temperature is equal to or higher than the melting point of Ag or Cu or alloy containing Ag or Cu as a major component. Therefore, electrodes made of these materials cannot be used undesirably. If the amount of the glass component exceeds 30 parts by weight, there is a tendency that excellent sintering cannot be performed due to elution of glass.

$Zn_2TiO_4$ used in the present invention can be obtained by mixing zinc oxide ZnO and titanium oxide $TiO_2$ at a molar ratio of 2:1 and calcining the obtained mixture. $ZnTiO_3$ can be obtained by mixing zinc oxide ZnO and titanium oxide $TiO_2$ at a molar ratio of 1:1 and calcining the obtained mixture. As raw materials of $Zn_2TiO_4$ and $ZnTiO_3$, it is possible to use nitrate, carbonate, hydroxide, chloride, organic metal compounds, and the like which contain Zn and/or Ti to form oxide at the time of calcination, in addition to $TiO_2$ and ZnO.

The dielectric ceramic composition is characterized by containing a predetermined amount of particular glass. The glass used in the present invention contains ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %. These oxide components are mixed at a predetermined ratio and are melted, cooled, and vitrified.

The composition of the glass used in the present invention will now be described in the following. ZnO has a tendency that at a rate lower than 50 wt %, the softening point of glass is so high that excellent sintering cannot be performed, and at a rate higher than 75 wt %, vitrification is difficult at a desired temperature. $B_2O_3$ has a tendency that at a rate lower than 5 wt %, the softening point of glass is so high that excellent sintering cannot be performed, and at a rate higher than 30 wt %, excellent sintering cannot be performed due to elution of glass. $SiO_2$ has a tendency that at a rate lower than 6 wt % or higher than 15 wt %, the softening point of glass is so high that excellent sintering cannot be performed. $Al_2O_3$ has a tendency that at a rate lower than 0.5 wt %, chemical durability of the dielectric ceramics obtained degrades, and at a rate higher than 5 wt %, vitrification is difficult at a desired temperature. BaO has a tendency that at a rate lower than 3 wt % or higher than 10 wt %, vitrification is difficult at a desired temperature. If glass contains a component of Pb or Bi, the Q-value of the dielectric ceramic composition tends to decrease. Since glass does not contain Pb according to the dielectric ceramic composition of the present invention, environmental pollution by Pb is not caused.

According to the present invention, with respect to 100 parts by weight of a major component expressed by a general formula of x'$Zn_2TiO_4$-(1-x'-y')$ZnTiO_3$-y'$TiO_2$ where x' is within a range of 0.15<x'<0.8 and y' is within a range of 0≦y'≦0.2, 3 to 30 parts by weight of lead-free low-melting glass is contained, the lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %. Accordingly, sintering can be achieved at a lower temperature of 800 to 1000° C. By sintering the dielectric ceramic composition as described above, the dielectric ceramics according to the present invention can be obtained. The dielectric ceramics of the present invention are characterized by a relative dielectric constant $\epsilon_r$ of about 15 to 25, a large unloaded Q-value, and an absolute value of 50 ppm/° C. or less which is the absolute value of the temperature coefficient $\tau_f$ of the resonant frequency. The composition of the dielectric ceramics is substantially the same as that of the raw materials of the dielectric ceramic composition, and comprising crystalline phases of $Zn_2TiO_4$, $ZnTiO_3$ and $TiO_2$ and a glass phase. According to the dielectric ceramic composition of the present invention, it is possible to perform low-temperature sintering to obtain dielectric ceramics having characteristics as described above.

In the present invention, grains of $Zn_2TiO_4$ and $ZnTiO_3$, and $TiO_2$ as an optional component, and glass grains are pulverized individually and mixed before sintering. Alternatively, grains of respective raw materials are mixed with each other and then pulverized before sintering. The average grain diameter of these raw materials before sintering should be preferably 2.0 μm or less, more preferably 1.0 μm or less, in order to obtain improved dispersiveness, a high no-loaded Q-value and a stable relative dielectric constant $\epsilon_r$. If the average grain diameter is too small, handling may be difficult in some cases. Hence, the average grain diameter should also preferably be 0.05 μm or more.

Next, a method of manufacturing the dielectric ceramic composition and dielectric ceramics of the present invention will be described. Powder of row material of ZnO and powder of row material of $TiO_2$ are mixed and calcined, to obtain ceramic powder containing $Zn_2TiO_4$ and $ZnTiO_3$, and $TiO_2$ as an optional component. This ceramic powder is mixed with lead-free low-melting glass containing ZnO at 50 to 75 wt %, $B_2O_3$ at 5 to 30 wt %, $SiO_2$ at 6 to 15 wt %, $Al_2O_3$ at 0.5 to 5.5 wt %, and BaO at 3 to 10 wt %. Thus, the dielectric ceramic composition is obtained. Ceramic powder of each of $Zn_2TiO_4$, $ZnTiO_3$ and $TiO_2$ may be prepared individually. Alternatively, the ratio between raw materials of ZnO and $TiO_2$ may be adjusted to directly obtain powder containing $Zn_2TiO_4$, $ZnTiO_3$ and $TiO_2$ in a mixed state.

The method of individually preparing powder of each of $Zn_2TiO_4$ and $ZnTiO_3$ to obtain the dielectric ceramic composition of the present invention will further be described. At first, zinc oxide and titanium oxide at a molar ratio of 2:1 are weighed, and are blended together with a solvent such as water, alcohol, or the like. Subsequently, water, alcohol, or the like is removed from the resultant, which is then subjected to calcination at a temperature of 900 to 1200° C. in an oxygen-contained atmosphere (e.g., in an air atmosphere) for about 1 to 5 hours. Calcined powder thus obtained consists of $Zn_2TiO_4$. Next, titanium oxide and zinc oxide at a molar ratio of 1:1 are weighed. $ZnTiO_3$ is prepared in the same preparation method as $Zn_2TiO_4$. A predetermined amount of major component containing $Zn_2TiO_4$, $ZnTiO_3$ and $TiO_2$ is weighed. Further, lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt % is weighed to satisfy a predetermined ratio to the major component. The glass and the major component are blended together with a solvent such as water, alcohol, or the like. Subsequently, the water, alcohol, or the like is removed and thereafter pulverized to prepare the dielectric ceramic composition intended, which is raw material powder for the dielectric ceramics.

The dielectric ceramic composition of the present invention is sintered to form a pellet of dielectric ceramics, and the dielectric characteristic thereof is measured. More specifically, an organic binder such as polyvinyl alcohol is mixed with the raw material powder for dielectric ceramics to be homogenized. Drying and pulverizing are carried out, and thereafter, the resultant is pressed into a pellet form (under a pressure of about 100 to 1000 Kg/cm$^2$). The obtained formation is sintered at 800 to 1000° C. in an oxygen-contained gas atmosphere like air, thereby to obtain dielectric ceramics in which phases of $Zn_2TiO_4$, $ZnTiO_3$ and $TiO_2$ and a glass phase coexist.

The dielectric ceramic composition of the present invention according to the first embodiment is processed into an appropriate shape and an appropriate size upon necessity, or sheet forming based on a doctor blade method or the like and lamination of sheets and electrodes are carried out with use of the dielectric ceramic composition. Thus, the dielectric ceramic composition can be used as a material for constituting various kinds of laminated ceramic parts. Laminated ceramic parts may be a laminated ceramic condenser, LC filter, dielectric resonator, dielectric substrate, or the like.

The laminated ceramic part according to the first embodiment of the present invention has plural dielectric layers, an internal electrode formed between the dielectric layers, and an external electrode electrically connected to the internal electrode. The dielectric layer is constituted of dielectric ceramic obtained by sintering the dielectric ceramic composition according to the first embodiment of the present invention. The internal electrode is made of elemental Cu or elemental Ag, or an alloy material containing Cu or Ag as a major component. The laminated ceramic part according to the present invention can be obtained by simultaneously sintering the dielectric layers consisting of the dielectric ceramics and elemental Cu, elemental Ag or an alloy material containing Cu or Ag as a major component.

Figure 1:
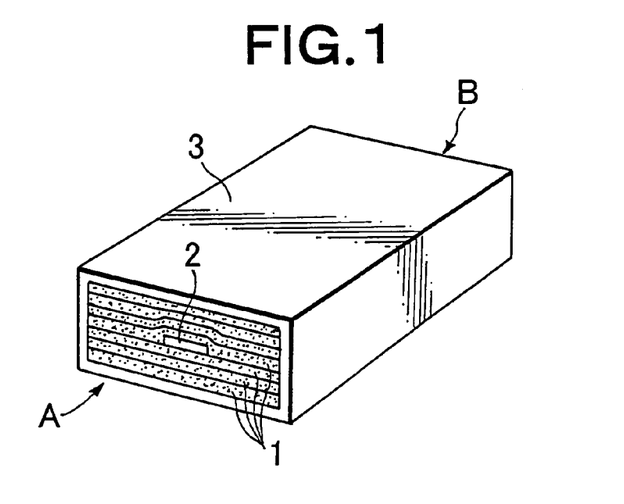
FIG. 1 is a schematic perspective view showing a tri-plate type resonator of a practical form according to the present invention.
Figure 2:
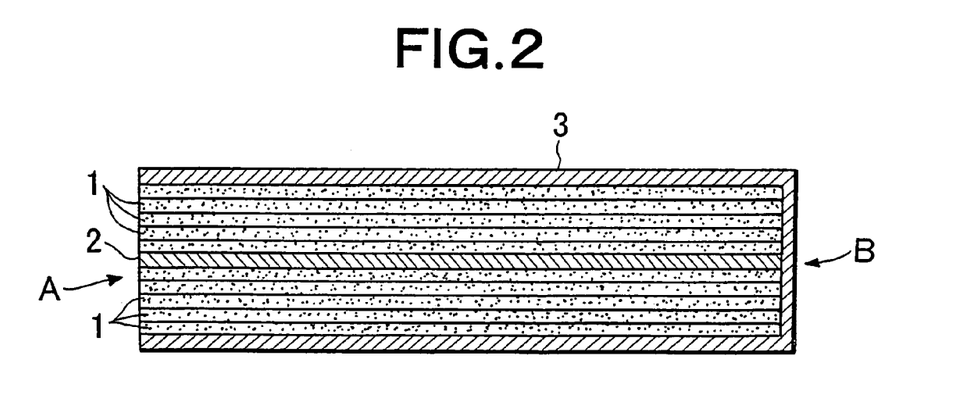
FIG. 2 is a schematic cross-sectional view of the resonator of FIG. 1.

A practical form of the laminated ceramic part of the present invention according to the first embodiment may be a tri-plate type resonator shown in FIGS. 1 and 2. FIG. 1 is a schematic perspective view showing the tri-plate type resonator of the practical form according to the present invention. FIG. 2 is a schematic cross-sectional view thereof. As shown in FIGS. 1 and 2, the tri-plate type resonator is a laminated ceramic part having a plurality of dielectric layers 1, an internal electrode 2 formed between the dielectric layers, and an external electrode 3 electrically connected to the internal electrode. The tri-plate type resonator is obtained by laminating the plurality of dielectric layers 1 with the internal electrode 2 disposed at a central portion. The internal electrode 2 is formed so as to pass through the resonator from a first face A to a second face B opposing the first face A. Only the first face A is an open face. The external electrode 3 is formed on five faces of the resonator exclusive of the first face A. The internal electrode 2 and the external electrode 3 are connected to each other on the second face B. The material of the internal electrode 2 contains Cu or Ag, or an alloy material containing Cu or Ag as a major component. Since the dielectric ceramic composition according to the present invention can be sintered at a low temperature, these materials for the internal electrode can be used.

(2) Second Embodiment of the Present Invention

A dielectric ceramic composition according to the second embodiment of the present invention will now be described in details hereinafter.

The composition according to the present invention is a dielectric ceramic composition which contains a major component containing $Zn_2TiO_4$, $ZnTiO_3$ and $Al_2O_3$, and $TiO_2$ as an optional component, and a glass component. The major component is expressed by a general formula of $xZn_2TiO_4$-$yZnTiO_3$-$zTiO_2$-$wAl_2O_3$ where x is within a range of $0.15<x<1.0$, y is within a range of $0<y<0.85$, z is within a range of $0 \leq z \leq 0.2$, w is within a range of $0<w \leq 0.2$, and $x+y+z+w=1$ is satisfied. $Zn_2TiO_4$, $ZnTiO_3$, $TiO_2$ and $Al_2O_3$ each has a crystalline form. On the other side, the glass component may be glass containing ZnO at 50 to 75 wt % and $B_2O_3$ at 5 to 30 wt %. The dielectric ceramic composition of the present invention contains 3 to 30 parts by weight of the glass component with respect to 100 parts by weight of the major component.

In the composition described above, the molar fraction x of $Zn_2TiO_4$ should preferably be within a range of greater than 0.15 and smaller than 1.0, particularly greater than 0.15 and smaller than 0.99. If x is 0.15 or less or x is 1.0, the absolute value of $\tau_f$ exceeds 50 ppm/° C. undesirably.

Also in the composition described above, the molar fraction y of $ZnTiO_3$ should preferably be within a range of greater than 0 and smaller than 0.85, particularly greater than 0.005 and smaller than 0.85. If y is 0 or y is 0.85 or more, the absolute value of $\tau_f$ exceeds 50 ppm/° C. undesirably.

Also in the composition described above, the molar fraction z of $TiO_2$ should preferably be within a range of 0 to 0.2. Since $TiO_2$ is contained, the dielectric constant tends to increase slightly. However, the advantages which the present invention aims at can be attained in any composition that has z of 0.2 or less. If z is greater than 0.2, $\tau_f$ exceeds +50 ppm/° C. undesirably.

Also in the composition described above, the molar fraction w of $Al_2O_3$ should preferably be greater than 0 and not greater than 0.2, particularly greater than 0.005 and not greater than 0.2. If w is 0, changes in the dielectric characteristic which are caused by changes in the sintering temperature become greater, and therefore, the range of the sintering temperature narrows undesirably. If w is greater than 0.2, the sintering temperature becomes equal to or higher than a temperature of the melting point of Ag or Cu or alloy containing Ag or Cu as a major component. This undesirably prevents use of the electrodes of such materials which is an object of the present invention.

Also in the dielectric ceramic composition of the present invention, the amount of the glass component should preferably be within a range of 3 to 30 parts by weight with respect to 100 parts by weight of the major component which constitutes ceramic base material. In case where the amount of the glass component is less than 3 parts by weight, the sintering temperature is equal to or higher than the melting point of Ag or Cu or alloy containing Ag or Cu as a major component. Therefore, electrodes of these materials cannot be used, undesirably. If the amount of the glass component exceeds 30 parts by weight, there is a tendency that excellent sintering cannot be performed due to elution of glass.

$Zn_2TiO_4$ used in the present invention can be obtained by mixing zinc oxide ZnO and titanium oxide $TiO_2$ at a molar ratio of 2:1 and calcining the obtained mixture. $ZnTiO_3$ can be obtained by mixing zinc oxide ZnO and titanium oxide $TiO_2$ at a molar ratio of 1:1 and calcining the obtained mixture. As raw materials of $Zn_2TiO_4$ and $ZnTiO_3$, it is possible to use nitrate, carbonate, hydroxide, chloride, organic metal compounds, and the like which contain Zn and/or Ti to form oxide at the time of calcination, in addition to $TiO_2$ and ZnO.

The glass used in the present invention should preferably be glass containing ZnO at 50 to 75 wt %. Since a ZnO component is contained in the glass, the ZnO component of $Zn_2TiO_4$ and $ZnTiO_3$ constituting the major component can be inhibited from shifting to a glass phase. Therefore, changes in the dielectric characteristic caused by changes in the composition during sintering can be reduced. In addition, if the glass contains $B_2O_3$ at 5 to 30 wt %, the low-temperature sintering easily proceeds desirably. A particularly preferred glass component contains ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %. In case of a dielectric ceramic composition in which the glass component is mixed with the major component described above, the relative dielectric constant $\epsilon_r$ can be within a preferable range of about 15 to 25. Used as the glass to be mixed is glass which is obtained by melting, cooling and vitrificating respective oxide components as described above mixed at a predetermined ratio. The composition of the glass used in the present invention will now be described in the following. ZnO has a tendency that at a rate lower than 50 wt %, the softening point of glass is so high that excellent sintering cannot be performed, and at a rate higher than 75 wt %, vitrification is difficult at a desired temperature. $B_2O_3$ has a tendency that at a rate lower than 5 wt %, the softening point of glass is so high that excellent sintering cannot be performed, and at a rate higher than 30 wt %, excellent sintering cannot be performed due to elution of glass. $SiO_2$ has a tendency that at a rate lower than 6 wt % or higher than 15 wt %, the softening point of glass is so high that excellent sintering cannot be performed. $Al_2O_3$ has a tendency that at a rate lower than 0.5 wt %, chemical durability of the dielectric ceramics obtained degrades, and at a rate higher than 5 wt %, vitrification is difficult at a desired temperature. BaO has a tendency that at a rate lower than 3 wt % or higher than 10 wt %, vitrification is difficult at a desired temperature. If glass contains a component of Pb or Bi, the Q-value of the dielectric ceramic composition tends to decrease. Since glass does not contain Pb according to the dielectric ceramic composition of the present invention, environmental pollution by Pb is not caused.

According to the present invention, with respect to 100 parts by weight of a major component expressed by a general formula of $xZn_2TiO_4$-$yZnTiO_3$-$zTiO_2$-$wAl_2O_3$ where x satisfies $0.15<x<1.0$, y satisfies $0<y<0.85$, z satisfies $0 \leqq z \leqq 0.2$, w satisfies $0<w \leqq 0.2$, and $x+y+z+w=1$ is satisfied, 3 to 30 parts by weight of a glass component containing ZnO and $B_2O_3$ is contained. Accordingly, sintering can be achieved at a lower temperature of 800 to 1000° C. By sintering the dielectric ceramic composition as described above, the dielectric ceramics according to the present invention can be obtained. The dielectric ceramics of the present invention is characterized by a relative dielectric constant $\epsilon_r$ of 10 to 40, preferably about 15 to 25, a large no-loaded Q-value, and an absolute value of 50 ppm/° C. or less which is the absolute value of the temperature coefficient $\tau_f$ of the resonant frequency. The composition of the dielectric ceramics is substantially the same as that of the raw materials of the dielectric ceramic composition, and comprising crystalline phases of $Zn_2TiO_4$, $ZnTiO_3$, $TiO_2$ and $Al_2O_3$, and a glass phase. According to the dielectric ceramic composition of the present invention, it is possible to perform low-temperature sintering to obtain dielectric ceramics having characteristics as described above.

The dielectric ceramic composition of the present invention is expressed as a mixture of $Zn_2TiO_4$, $ZnTiO_3$, $TiO_2$, $Al_2O_3$ and the glass described above before sintering. Even if this mixture is further mixed with additives such as a solvent, organic material, and the like added in a preparation process, the mixed resultant is a dielectric ceramic composition intended by the present invention. The mixture of the ceramic composition according to the present invention causes less changes in compositions of the crystalline phases and glass phase even after sintering. Therefore, dielectric ceramics obtained by sintering the mixture is dielectric ceramics constituted by the dielectric ceramic composition of the present invention.

In the present invention, grains of $Zn_2TiO_4$, $ZnTiO_3$, $TiO_2$ and $Al_2O_3$, and glass grains are pulverized individually and mixed before sintering. Alternatively, grains of respective raw materials are mixed with each other and then pulverized before sintering. The average grain diameter of these raw materials before sintering should be preferably 2.0 µm or less, more preferably 1.0 µm or less, in order to obtain improved dispersiveness, a high no-loaded Q-value and a stable relative dielectric constant $\epsilon_r$. If the average grain diameter is too small, handling may be difficult in some cases. Hence, the average grain diameter should also preferably be 0.05 µm or more.

Next, a method of manufacturing the dielectric ceramic composition and dielectric ceramics of the present invention will be described. Powder of each of $Zn_2TiO_4$, $ZnTiO_3$ and $TiO_2$ constituting part of the major component may be prepared individually. Alternatively, with the ratio between raw materials of ZnO and $TiO_2$ adjusted, calcination may be carried out, to obtain directly mixed powder of $Zn_2TiO_4$, $ZnTiO_3$ and $TiO_2$. In order to obtain mixed powder of $Zn_2TiO_4$, $ZnTiO_3$ and $TiO_2$ by performing one calcination step, powder of raw materials of ZnO and $TiO_2$ may be mixed at a preset ratio and calcined. A resultant may be mixed with a predetermined amount of $Al_2O_3$, and then can be used as the major component of the dielectric ceramic composition of the present invention. To obtain the dielectric ceramic composition of the present invention, 100 parts by weight of the major component may be mixed with 3 to 30 parts by weight of a glass component containing ZnO at 50 to 75 wt % and $B_2O_3$ at 5 to 30 wt %.

In a preferable method of manufacturing the dielectric ceramic composition, powder of raw material of ZnO and powder of raw material of $TiO_2$ are mixed and calcined to obtain ceramic powder containing $Zn_2TiO_4$, $ZnTiO_3$ and $TiO_2$. This ceramic powder is mixed with a predetermined amount of lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %.

In case of preparing individually ceramic powder of each of $Zn_2TiO_4$ and $ZnTiO_3$, titanium oxide ($TiO_2$) and zinc oxide (ZnO) may be mixed at molar ratios of 2:1 and 1:1 respectively for $Zn_2TiO_4$ and $ZnTiO_3$ and then calcined. Predetermined amounts of obtained $Zn_2TiO_4$, $ZnTiO_3$, $TiO_2$ and $Al_2O_3$ are weighed and mixed, and then, the resultant can be used as the major component of the dielectric ceramic composition of the present invention.

The method of individually preparing powder of each of $Zn_2TiO_4$ and $ZnTiO_3$ to obtain the dielectric ceramic composition of the present invention will now be described in further details. At first, titanium oxide ($TiO_2$) and zinc oxide (ZnO) at a molar ratio of 2:1 are weighed, and are blended together with a solvent such as water, alcohol, or the like. Subsequently, water, alcohol, or the like is removed from the resultant. Thereafter, the resultant is pulverized and subjected to calcination at a temperature of 900 to 1200° C. in an oxygen-contained atmosphere (e.g., in an air atmosphere) for about 1 to 5 hours. Calcined powder thus obtained consists of $Zn_2TiO_4$. Next, titanium oxide and zinc oxide at a molar ratio of 1:1 are weighed. $ZnTiO_3$ is prepared in the same preparation method as $Zn_2TiO_4$. $Zn_2TiO_4$, $ZnTiO_3$, and further $TiO_2$ and $Al_2O_3$, and the glass at a predetermined ratio are weighed, and are blended together with a solvent such as water, alcohol, or the like. Subsequently, water, alcohol, or the like is removed, and thereafter, the resultant is pulverized to prepare the dielectric ceramic composition intented, which is powder of raw material for the dielectric ceramics.

The dielectric ceramic composition of the present invention is sintered to form a pellet of dielectric ceramics, and the dielectric characteristic thereof is measured. More specifically, an organic binder such as polyvinyl alcohol is mixed with the raw material powder for dielectric ceramics to be homogenized. Drying and pulverizing are carried out, and thereafter, the resultant is pressed to have a pellet form (under a pressure of about 100 to 1000 $Kg/cm^2$). The obtained formation is sintered at 800 to 1000° C. in an oxygen-contained gas atmosphere like air, thereby to obtain dielectric ceramics in which phases of $Zn_2TiO_4$, $ZnTiO_3$, $TiO_2$ and $Al_2O_3$, and a glass phase coexist.

The dielectric ceramic composition according to the second embodiment can be used as material for various laminated ceramic parts like in the first embodiment.

The laminated ceramic part of the present invention according to the second embodiment are obtained in the same manner as that of the first embodiment except that the dielectric layers are made of dielectric ceramics obtained by sintering the dielectric ceramic composition of the present invention according to the second embodiment.

EXAMPLES

Examples of the present invention and relevant comparative examples thereof will now be described.

Example 1

Figure 3:
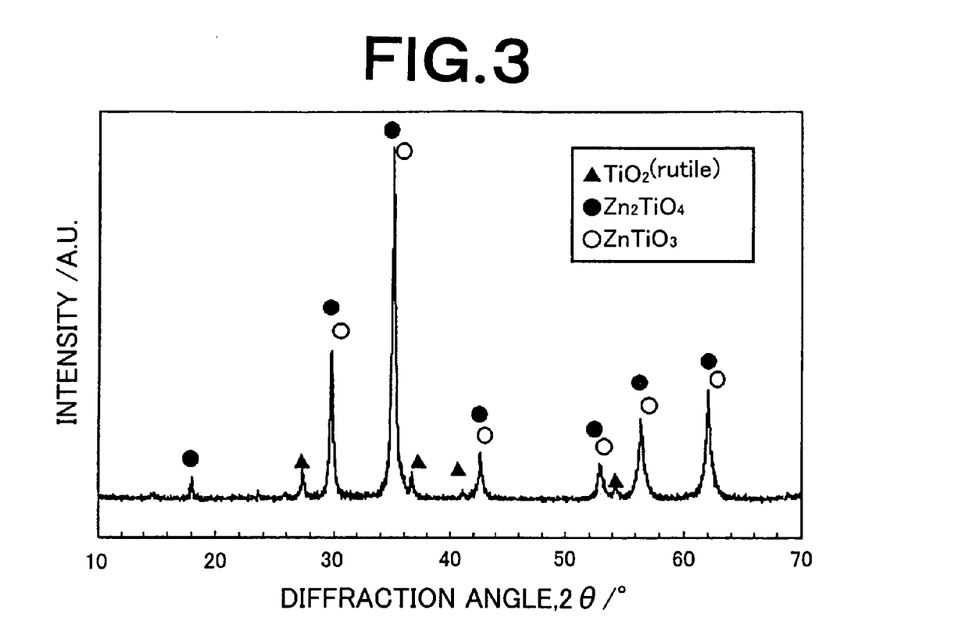
FIG. 3 shows an X-ray diffraction pattern of a pellet prepared by sintering dielectric ceramic composition of the present invention in Example 1.

Example Belonging to the First Embodiment of the Present Invention 0.33 mole of titanium oxide ($TiO_2$) and 0.66 mole of zinc oxide (ZnO) together with ethanol were put in a ball mill and blended for 12 hours. After removing the solvent from the solution, the resultant was pulverized and calcined in an air atmosphere at 1000° C. to obtain calcined powder of $Zn_2TiO_4$. Next, 0.5 mole of $TiO_2$ and 0.5 mole of ZnO were blended in the same manner as described above and were calcined to obtain calcined powder of $ZnTiO_3$. The calcined powders of $Zn_2TiO_4$ and $ZnTiO_3$ thus obtained, and $TiO_2$ were mixed at a ratio shown in Table 1, to prepare a base material (major component). To 100 parts by weight of this base material, 10 parts by weight of glass powder consisting of ZnO at 63.5 wt %, $SiO_2$ at 8 wt %, $Al_2O_3$ at 1.5 wt %, BaO at 7 wt %, and $B_2O_3$ at 20 wt % was added, and the resultant was put in a ball mill and was blended for 24 hours. After removing the solvent from the solution, the resultant was pulverized till the average grain diameter became 1 µm. To the pulverized resultant was added an appropriate amount of a polyvinyl alcohol solution, followed by drying. Thereafter, the resultant was shaped into a pellet having a diameter of 12 mm and a thickness of 4 mm and the pellet obtained was sintered in an air atmosphere at 900° C. for 2 hours. FIG. 3 shows an X-ray diffraction pattern of the sintered pellet prepared. As can be seen from FIG. 3, phases of $Zn_2TiO_4$, $ZnTiO_3$ and $TiO_2$ coexist in the sintered pellet of the dielectric ceramic composition according to the present invention.

The dielectric ceramics thus obtained was processed into a size having a diameter of 7 mm and a thickness of 3 mm. Thereafter, the no-loaded Q-value at the resonant frequency of 7 to 11 GHz, the relative dielectric constant $\epsilon_r$ and the temperature coefficient $\tau_f$ of resonant frequency were measured, according to a dielectric resonance method. Table 2 shows the results.

TABLE 1

| | | Base material composition (Molar fraction) | | | Glass composition | | | | | | | Amount of base material | Amount of glass | Post-pulverization Average grain |
|---|---|---|---|---|---|---|---|---|---|---|---|---|---|---|
| | | Zn2TiO4 | ZnTiO3 | TiO2 | | | | (wt %) | | | | (part | (part by | diameter |
| | | x' | 1 − x' − y' | y' | SiO2 | Al2O3 | ZnO | BaO | B2O3 | Bi2O3 | PbO | by weight) | weight) | (μm) |
| Example | 1 | 0.22 | 0.77 | 0.01 | 8.0 | 1.5 | 63.5 | 7.0 | 20.0 | 0.0 | 0.0 | 100 | 10 | 1 |
| | 2 | 0.40 | 0.59 | 0.01 | 8.0 | 1.5 | 63.5 | 7.0 | 20.0 | 0.0 | 0.0 | 100 | 10 | 1 |
| | 3 | 0.75 | 0.24 | 0.01 | 8.0 | 1.5 | 63.5 | 7.0 | 20.0 | 0.0 | 0.0 | 100 | 10 | 1 |
| | 4 | 0.22 | 0.78 | 0.00 | 8.0 | 1.5 | 63.5 | 7.0 | 20.0 | 0.0 | 0.0 | 100 | 10 | 1 |
| | 5 | 0.20 | 0.70 | 0.10 | 8.0 | 1.5 | 63.5 | 7.0 | 20.0 | 0.0 | 0.0 | 100 | 10 | 1 |
| | 6 | 0.18 | 0.62 | 0.20 | 8.0 | 1.5 | 63.5 | 7.0 | 20.0 | 0.0 | 0.0 | 100 | 10 | 1 |
| | 7 | 0.22 | 0.77 | 0.01 | 8.0 | 1.5 | 63.5 | 7.0 | 20.0 | 0.0 | 0.0 | 100 | 10 | 2 |
| | 8 | 0.22 | 0.77 | 0.01 | 8.0 | 1.5 | 63.5 | 7.0 | 20.0 | 0.0 | 0.0 | 100 | 10 | 0.5 |
| | 9 | 0.22 | 0.77 | 0.01 | 8.0 | 1.5 | 63.5 | 7.0 | 20.0 | 0.0 | 0.0 | 100 | 10 | 0.1 |
| | 10 | 0.22 | 0.77 | 0.01 | 6.0 | 1.5 | 71.0 | 3.5 | 18.0 | 0.0 | 0.0 | 100 | 10 | 1 |
| | 11 | 0.22 | 0.77 | 0.01 | 8.0 | 5.0 | 50.0 | 10.0 | 27.0 | 0.0 | 0.0 | 100 | 10 | 1 |
| | 12 | 0.22 | 0.77 | 0.01 | 10.0 | 5.0 | 50.0 | 5.0 | 30.0 | 0.0 | 0.0 | 100 | 10 | 1 |
| | 13 | 0.22 | 0.77 | 0.01 | 8.0 | 1.5 | 63.5 | 7.0 | 20.0 | 0.0 | 0.0 | 100 | 5 | 1 |
| | 14 | 0.22 | 0.77 | 0.01 | 8.0 | 1.5 | 63.5 | 7.0 | 20.0 | 0.0 | 0.0 | 100 | 25 | 1 |
| Comp. Example | 1 | 0.10 | 0.86 | 0.01 | 8.0 | 1.5 | 63.5 | 7.0 | 20.0 | 0.0 | 0.0 | 100 | 10 | 1 |
| | 2 | 0.85 | 0.14 | 0.01 | 8.0 | 1.5 | 63.5 | 7.0 | 20.0 | 0.0 | 0.0 | 100 | 10 | 1 |
| | 3 | 0.16 | 0.54 | 0.30 | 8.0 | 1.5 | 63.5 | 7.0 | 20.0 | 0.0 | 0.0 | 100 | 10 | 1 |
| | 4 | 0.11 | 0.39 | 0.50 | 8.0 | 1.5 | 63.5 | 7.0 | 20.0 | 0.0 | 0.0 | 100 | 10 | 1 |
| | 5 | 0.22 | 0.77 | 0.01 | 8.0 | 1.5 | 18.5 | 7.0 | 20.0 | 45.0 | 0.0 | 100 | 10 | 1 |
| | 6 | 0.22 | 0.77 | 0.01 | 8.0 | 1.5 | 20.5 | 7.0 | 20.0 | 0.0 | 43.0 | 100 | 10 | 1 |
| | 7 | 0.22 | 0.77 | 0.01 | 20.0 | 0.5 | 75.0 | 2.5 | 2.0 | 0.0 | 0.0 | 100 | 10 | 1 |
| | 8 | 0.22 | 0.77 | 0.01 | 17.0 | 7.0 | 42.0 | 1.0 | 33.0 | 0.0 | 0.0 | 100 | 10 | 1 |
| | 9 | 0.22 | 0.77 | 0.01 | 10.0 | 5.0 | 33.0 | 2.0 | 50.0 | 0.0 | 0.0 | 100 | 10 | 1 |
| | 10 | 0.22 | 0.77 | 0.01 | 4.0 | 1.6 | 66.3 | 7.3 | 20.9 | 0.0 | 0.0 | 100 | 10 | 1 |
| | 11 | 0.22 | 0.77 | 0.01 | 18.0 | 1.3 | 56.6 | 6.2 | 17.8 | 0.0 | 0.0 | 100 | 10 | 1 |
| | 12 | 0.22 | 0.77 | 0.01 | 8.1 | 0.1 | 64.4 | 7.1 | 20.3 | 0.0 | 0.0 | 100 | 10 | 1 |
| | 13 | 0.22 | 0.77 | 0.01 | 7.6 | 7.0 | 60.0 | 6.6 | 18.9 | 0.0 | 0.0 | 100 | 10 | 1 |
| | 14 | 0.22 | 0.77 | 0.01 | 11.4 | 2.1 | 48.0 | 10.0 | 28.5 | 0.0 | 0.0 | 100 | 10 | 1 |
| | 15 | 0.22 | 0.77 | 0.01 | 4.4 | 0.8 | 80.0 | 3.8 | 11.0 | 0.0 | 0.0 | 100 | 10 | 1 |
| | 16 | 0.22 | 0.77 | 0.01 | 8.4 | 1.6 | 66.9 | 2.0 | 21.1 | 0.0 | 0.0 | 100 | 10 | 1 |
| | 17 | 0.22 | 0.77 | 0.01 | 7.6 | 1.4 | 60.1 | 12.0 | 18.9 | 0.0 | 0.0 | 100 | 10 | 1 |
| | 18 | 0.22 | 0.77 | 0.01 | 9.6 | 1.8 | 76.2 | 8.4 | 4.0 | 0.0 | 0.0 | 100 | 10 | 1 |
| | 19 | 0.22 | 0.77 | 0.01 | 6.5 | 1.2 | 51.6 | 5.7 | 35.0 | 0.0 | 0.0 | 100 | 10 | 1 |
| | 20 | 0.22 | 0.77 | 0.01 | 8.0 | 1.5 | 63.5 | 7.0 | 20.0 | 0.0 | 0.0 | 100 | 2 | 1 |
| | 21 | 0.22 | 0.77 | 0.01 | 8.0 | 1.5 | 63.5 | 7.0 | 20.0 | 0.0 | 0.0 | 100 | 40 | 1 |

TABLE 2

| | | $\epsilon r$ | Q × f (GHz) | τ f (ppm/° C.) | Sintering temp. ° C. |
|---|---|---|---|---|---|
| Example | 1 | 20.0 | 10000 | 0 | 900 |
| | 2 | 19.3 | 10000 | −5 | 900 |
| | 3 | 18.0 | 9000 | −43 | 900 |
| | 4 | 19.8 | 10000 | −3 | 900 |
| | 5 | 22.1 | 12000 | 15 | 900 |
| | 6 | 24.5 | 13000 | 30 | 900 |
| | 7 | 20.0 | 10000 | 0 | 900 |
| | 8 | 19.0 | 8000 | 10 | 900 |
| | 9 | 17.5 | 6000 | 30 | 900 |
| | 10 | 19.5 | 13000 | −20 | 900 |
| | 11 | 18.0 | 12000 | −5 | 900 |
| | 12 | 16.0 | 8000 | −20 | 900 |
| | 13 | 22.0 | 13000 | 10 | 900 |
| | 14 | 18.0 | 7500 | −10 | 900 |
| Comp. Example | 1 | 23.5 | 12000 | 55 | 900 |
| | 2 | 17.2 | 7000 | −55 | 900 |
| | 3 | 26.0 | 13000 | 53 | 900 |
| | 4 | 42.0 | 14000 | 80 | 900 |
| | 5 | 24.0 | 1000 | −60 | 900 |
| | 6 | 25.0 | 2000 | −70 | 900 |
| | 7 | Not sintered at 1000° C. or lower | | | |
| | 8 | Glass was eluted at 800° C. or higher | | | |
| | 9 | Glass was eluted at 800° C. or higher | | | |
| | 10 | Not sintered at 1000° C. or lower | | | |
| | 11 | Not sintered at 1000° C. or lower | | | |
| | 12 | Melted in 4 wt % sulfuric acid solution | | | |
| | 13 | Not sintered at 1000° C. or lower | | | |
| | 14 | Not sintered at 1000° C. or lower | | | |
| | 15 | Not sintered at 1000° C. or lower | | | |
| | 16 | Not sintered at 1000° C. or lower | | | |
| | 17 | Not sintered at 1000° C. or lower | | | |
| | 18 | Not sintered at 1000° C. or lower | | | |
| | 19 | Glass was eluted at 800° C. or higher | | | |
| | 20 | Not sintered at 1000° C. or lower | | | |
| | 21 | Glass was eluted at 900° C. or higher | | | |

To 100 g of the mixture of the base material and the glass, 9 g of polyvinyl butyral as a binder, 6 g of dibutylphthalate as a plasticizer, and 60 g of toluene and 30 g of isopropyl alcohol both as a solvent were added to prepare a green sheet having a thickness of 100 μm, according to the doctor blade method. Then, 22 layers of the green sheets were laminated by the thermo compression bonding of applying a pressure of 200 kg/cm² at a temperature of 65° C. At this time, a layer having been printed with Ag as an internal electrode was positioned such that it was provided at the center in the thickness direction. After sintering the obtained laminate at 900° C. for 2 hours, an external electrode was formed to prepare a tri-plate type resonator. The resonator had a size of 4.9 mm in width, 1.7 mm in height, and 8.4 mm in length.

The obtained tri-plate type resonator was evaluated on the no-loaded Q-value at a resonant frequency of 2 GHz. As a result, the no-loaded Q-value of the tri-plate type resonator was 210. Thus, it was possible to obtain a tri-plate type resonator having an excellent characteristic by using the dielectric ceramic composition according to the present invention.

Examples 2 and 3

Examples Belonging to the First Embodiment

Influence of x'

In the same manner as in the example 1 described above, mixtures of $Zn_2TiO_4$, $ZnTiO_3$ and $TiO_2$ mixed at ratios shown in Table 1 were used as base materials. These base materials were mixed with glass at the ratio also shown in Table 1. Then, sintered pellets were prepared under the same conditions as in the example 1, and were evaluated on various characteristics in the same method as in the example 1. The results thereof are shown in Table 2.

Examples 4 to 6

Examples Belonging to the First Embodiment

Influence of y'

In the same manner as in the example 1 described above, mixtures of $Zn_2TiO_4$, $ZnTiO_3$ and $TiO_2$ mixed at ratios shown in Table 1 were used as base materials. These base materials were mixed with glass at the ratio also shown in Table 1. Then, sintered pellets were prepared under the same conditions as in the example 1, and were evaluated on various characteristics in the same method as in the example 1. The results thereof are shown in Table 2.

Examples 7 to 9

Examples Belonging to the First Embodiment

Influence of the Grain Diameter

In the same manner as in the example 1 described above, mixtures of $Zn_2TiO_4$, $ZnTiO_3$ and $TiO_2$ mixed at ratios shown in Table 1 were used as base materials. These base materials were mixed with glass at the ratio also shown in Table 1, and the resultant was pulverized until the grain diameter thereof became the average grain diameters shown in Table 1. Then, sintered pellets were prepared under the same conditions as in the example 1, and were evaluated on various characteristics in the same method as in the example 1. The results thereof are shown in Table 2.

Examples 10 to 12

Examples Belonging to the First Embodiment

Influence of the Glass Composition

In the same manner as in the example 1 described above, mixtures of $Zn_2TiO_4$, $ZnTiO_3$ and $TiO_2$ mixed at ratios shown in Table 1 were used as base materials. These base materials were mixed with glass of various compositions at the ratio also shown in Table 1. Then, sintered pellets were prepared under the same conditions as in the example 1, and were evaluated on various characteristics in the same method as in the example 1. The results thereof are shown in Table 2.

Examples 13 and 14

Examples Belonging to the First Embodiment

Influence of the Glass Amount

In the same manner as in the example 1 described above, mixtures of $Zn_2TiO_4$, $ZnTiO_3$ and $TiO_2$ mixed at ratios shown in Table 1 were used as base materials. These base materials were mixed with glass at the ratio also shown in Table 1. Then, sintered pellets were prepared under the same conditions as in the example 1, and were evaluated on various characteristics in the same method as in the example 1. The results thereof are shown in Table 2.

Comparative Examples 1 and 2

Influence of x'

In the same manner as in the example 1 described above, mixtures of $Zn_2TiO_4$, $ZnTiO_3$ and $TiO_2$ mixed at ratios shown in Table 1 were used as base materials. These base materials were mixed with glass at the ratio also shown in Table 1. Then, sintered pellets were prepared under the same conditions as in the example 1. However, when the molar ratio x' of $Zn_2TiO_4$ was smaller than 0.15, the temperature coefficient $\tau_f$ of resonant frequency was greater than +50 ppm/° C. When x' was greater than 0.8, the temperature coefficient $\tau_f$ of resonant frequency was smaller than −50 ppm/° C. The results thereof are shown in Table 2.

Comparative Examples 3 and 4

Influence of y'

In the same manner as in the example 1 described above, mixtures of $Zn_2TiO_4$, $ZnTiO_3$ and $TiO_2$ mixed at ratios shown in Table 1 were used as base materials. These base materials were mixed with glass at the ratio also shown in Table 1. Then, sintered pellets were prepared under the same conditions as in the example 1. However, when the molar ratio y' of $TiO_2$ was greater than 0.2, the temperature coefficient $\tau_f$ of resonant frequency was greater than +50 ppm/° C. The results thereof are shown in Table 2.

Comparative Examples 5 to 19

Influence of the Glass Composition

In the same manner as in the example 1 described above, mixtures of $Zn_2TiO_4$, $ZnTiO_3$ and $TiO_2$ mixed at ratios shown in Table 1 were used as base materials. These base materials were mixed with glass of various compositions at the ratio also shown in Table 1. Then, sintered pellets were prepared under the same conditions as in the example 1. However, when glass compositions which are out of the range of the glass compositions adopted in the present invention were used, the Q-value was lowered, and the temperature coefficient $\tau_f$ of resonant frequency was smaller than −50 ppm/° C. (Comparative Examples 5 and 6), glass was melted by a sulfuric acid solution (Comparative Example 12), or the pellets could not be sintered at 1000° C. or lower, or glass was eluted at 800° C. or higher (Comparative Examples 7 to 11 or 13 to 19). The results thereof are shown in Table 2.

Comparative Examples 20 and 21

Influence of the Glass Amount

In the same manner as in the example 1 described above, mixtures of $Zn_2TiO_4$, $ZnTiO_3$ and $TiO_2$ mixed at ratios shown in Table 1 were used as base materials. These base materials were mixed with glass at the ratio also shown in Table 1. Then, sintered pellets were prepared under the same conditions as in the example 1. However, when the glass amount was smaller than 3 parts by weight, sintering could not be achieved at 1000° C. or lower. When the glass amount is greater than 30 parts by weight, glass was eluted at 900° C. or higher, and reacted with a setter. The results thereof are shown in Table 2.

Example 15

Figure 4:
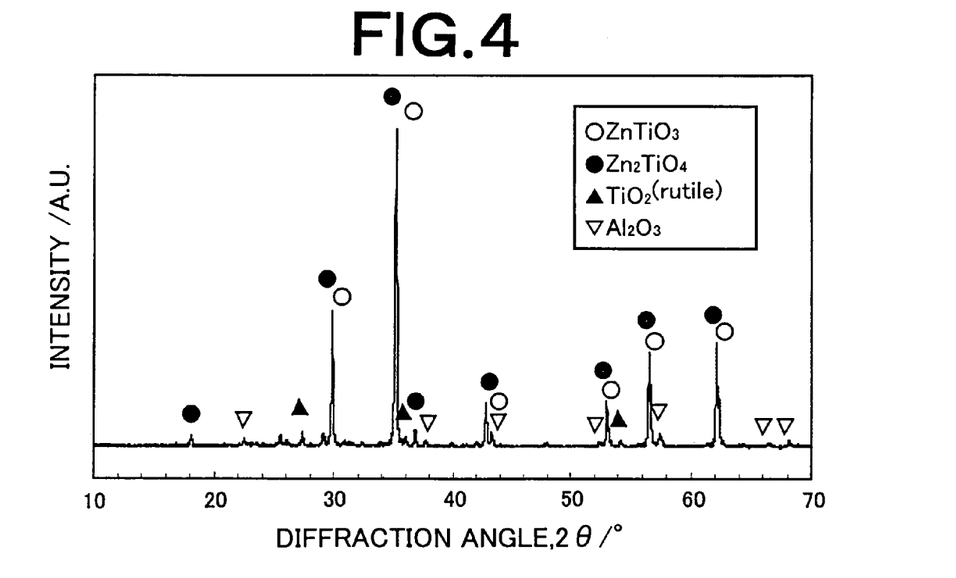
FIG. 4 shows an X-ray diffraction pattern of a pellet prepared by sintering dielectric ceramic composition of the present invention in Example 15, wherein reference numeral 1 denotes a dielectric layer, 2 an internal electrode, and 3 an external electrode.

Example Belonging to the Second Embodiment of the Present Invention 0.33 mole of titanium oxide ($TiO_2$) and 0.66 mole of zinc oxide (ZnO) together with ethanol were put in a ball mill and blended for 12 hours. After removing the solvent from the solution, the resultant was pulverized and calcined in an air atmosphere at 1000° C. to obtain calcined powder of $Zn_2TiO_4$. Next, 0.5 mole of $TiO_2$ and 0.5 mole of ZnO were blended in the same manner as described above and were calcined to obtain calcined powder of $ZnTiO_3$. The calcined powders of $Zn_2TiO_4$ and $ZnTiO_3$ thus obtained, and $TiO_2$ and $Al_2O_3$ were mixed at a ratio shown in Table 3, to prepare a base material (major component). To 100 parts by weight of this base material, 10 parts by weight of glass powder consisting of ZnO at 63.5 wt %, $SiO_2$ at 8 wt %, $Al_2O_3$ at 1.5 wt %, BaO at 7 wt %, and $B_2O_3$ at 20 wt % was added, and the resultant was put in a ball mill and was blended for 24 hours. After removing the solvent from the solution, the resultant was pulverized till the average grain diameter became 1 μm. To the pulverized resultant was added an appropriate amount of a polyvinyl alcohol solution, followed by drying. Thereafter, the resultant was shaped into a pellet having a diameter of 12 mm and a thickness of 4 mm and the pellet obtained was sintered in an air atmosphere at 850° C. for 2 hours (Example 15a). FIG. 4 shows an X-ray diffraction pattern of the sintered pellet prepared. As can be seen from FIG. 4, phases of $Zn_2TiO_4$, $ZnTiO_3$, $TiO_2$ and $Al_2O_3$ coexist in the sintered pellet of the dielectric ceramic composition according to the present invention. Another pellet obtained in the same manner was sintered in the same manner at 950° C. for 2 hours (Example 15b).

The dielectric ceramics thus obtained was processed into a size having a diameter of 7 mm and a thickness of 3 mm. Thereafter, the no-loaded Q-value at the resonant frequency of 7 to 11 GHz, the relative dielectric constant $\epsilon_r$ and the temperature coefficient $\tau_f$ of resonant frequency were measured, according to a dielectric resonance method. Table 4 shows the results.

TABLE 3

| | | Base material composition (molar fraction) | | | | Glass composition | | | | | Amount of base material | Amount of glass | Post-pulverization Average grain |
|---|---|---|---|---|---|---|---|---|---|---|---|---|---|
| | | Zn2TiO4 | ZnTiO3 | TiO2 | Al2O3 | | | (wt %) | | | (part by | (part by | diameter |
| | | x | y | z | w | SiO2 | Al2O3 | ZnO | BaO | B2O3 | weight) | weight) | (μm) |
| Example | 15a, b | 0.22 | 0.76 | 0.01 | 0.01 | 8.0 | 1.5 | 63.5 | 7.0 | 20.0 | 100 | 10 | 1 |
| | 16a, b | 0.40 | 0.58 | 0.01 | 0.01 | 8.0 | 1.5 | 63.5 | 7.0 | 20.0 | 100 | 10 | 1 |
| | 17a, b | 0.80 | 0.18 | 0.01 | 0.01 | 8.0 | 1.5 | 63.5 | 7.0 | 20.0 | 100 | 10 | 1 |
| | 18a, b | 0.97 | 0.01 | 0.01 | 0.01 | 8.0 | 1.5 | 63.5 | 7.0 | 20.0 | 100 | 10 | 1 |
| | 19a, b | 0.22 | 0.77 | 0.00 | 0.01 | 8.0 | 1.5 | 63.5 | 7.0 | 20.0 | 100 | 10 | 1 |
| | 20a, b | 0.20 | 0.69 | 0.10 | 0.01 | 8.0 | 1.5 | 63.5 | 7.0 | 20.0 | 100 | 10 | 1 |
| | 21a, b | 0.18 | 0.61 | 0.20 | 0.01 | 8.0 | 1.5 | 63.5 | 7.0 | 20.0 | 100 | 10 | 1 |
| | 22a, b | 0.22 | 0.75 | 0.01 | 0.02 | 8.0 | 1.5 | 63.5 | 7.0 | 20.0 | 100 | 10 | 1 |
| | 23a, b | 0.21 | 0.73 | 0.01 | 0.05 | 8.0 | 1.5 | 63.5 | 7.0 | 20.0 | 100 | 10 | 1 |
| | 24a, b | 0.19 | 0.65 | 0.01 | 0.15 | 8.0 | 1.5 | 63.5 | 7.0 | 20.0 | 100 | 10 | 1 |
| | 25a, b | 0.22 | 0.76 | 0.01 | 0.01 | 7.0 | 3.0 | 75.0 | 10.0 | 5.0 | 100 | 10 | 1 |
| | 26a, b | 0.22 | 0.76 | 0.01 | 0.01 | 6.0 | 1.5 | 72.0 | 2.5 | 18.0 | 100 | 10 | 1 |
| | 27a, b | 0.22 | 0.76 | 0.01 | 0.01 | 8.0 | 5.0 | 50.0 | 10.0 | 27.0 | 100 | 10 | 1 |
| | 28a, b | 0.22 | 0.76 | 0.01 | 0.01 | 10.0 | 5.0 | 50.0 | 5.0 | 30.0 | 100 | 10 | 1 |
| | 29a, b | 0.22 | 0.76 | 0.01 | 0.01 | 8.0 | 1.5 | 63.5 | 7.0 | 20.0 | 100 | 5 | 1 |
| | 30a, b | 0.22 | 0.76 | 0.01 | 0.01 | 8.0 | 1.5 | 63.5 | 7.0 | 20.0 | 100 | 25 | 1 |
| Comp. Example | 22a, b | 0.10 | 0.88 | 0.01 | 0.01 | 8.0 | 1.5 | 63.5 | 7.0 | 20.0 | 100 | 10 | 1 |
| | 23a, b | 0.98 | 0.00 | 0.01 | 0.01 | 8.0 | 1.5 | 63.5 | 7.0 | 20.0 | 100 | 10 | 1 |
| | 24a, b | 0.15 | 0.54 | 0.30 | 0.01 | 8.0 | 1.5 | 63.5 | 7.0 | 20.0 | 100 | 10 | 1 |
| | 25a, b | 0.11 | 0.38 | 0.50 | 0.01 | 8.0 | 1.5 | 63.5 | 7.0 | 20.0 | 100 | 10 | 1 |
| | 26a, b, c | 0.22 | 0.77 | 0.01 | 0 | 8.0 | 1.5 | 63.5 | 7.0 | 20.0 | 100 | 10 | 1 |
| | 27 | 0.16 | 0.58 | 0.01 | 0.25 | 8.0 | 1.5 | 63.5 | 7.0 | 20.0 | 100 | 10 | 1 |
| | 28 | 0.22 | 0.76 | 0.01 | 0.01 | 20.0 | 0.5 | 75.0 | 2.5 | 2.0 | 100 | 10 | 1 |
| | 29 | 0.22 | 0.76 | 0.01 | 0.01 | 17.0 | 7.0 | 42.0 | 1.0 | 33.0 | 100 | 10 | 1 |
| | 30 | 0.22 | 0.76 | 0.01 | 0.01 | 10.0 | 5.0 | 33.0 | 2.0 | 50.0 | 100 | 10 | 1 |
| | 31 | 0.22 | 0.76 | 0.01 | 0.01 | 25.0 | 1.5 | 45.0 | 8.5 | 20.0 | 100 | 10 | 1 |
| | 32 | 0.22 | 0.76 | 0.01 | 0.01 | 6.0 | 1.5 | 80.0 | 7.5 | 5.0 | 100 | 10 | 1 |

TABLE 3-continued

| | | Base material composition (molar fraction) | | | | Glass composition (wt %) | | | | | Amount of base material (part by weight) | Amount of glass (part by weight) | Post-pulverization Average grain diameter (μm) |
|---|---|---|---|---|---|---|---|---|---|---|---|---|---|
| | | Zn2TiO4 x | ZnTiO3 y | TiO2 z | Al2O3 w | SiO2 | Al2O3 | ZnO | BaO | B2O3 | | | |
| | 33 | 0.22 | 0.76 | 0.01 | 0.01 | 4.0 | 1.6 | 66.3 | 7.3 | 20.9 | 100 | 10 | 1 |
| | 34 | 0.22 | 0.76 | 0.01 | 0.01 | 18.0 | 1.3 | 56.6 | 6.2 | 17.8 | 100 | 10 | 1 |
| | 35 | 0.22 | 0.76 | 0.01 | 0.01 | 8.1 | 0.1 | 64.4 | 7.1 | 20.3 | 100 | 10 | 1 |
| | 36 | 0.22 | 0.76 | 0.01 | 0.01 | 7.6 | 7.0 | 60.0 | 6.6 | 18.9 | 100 | 10 | 1 |
| | 37 | 0.22 | 0.76 | 0.01 | 0.01 | 11.4 | 2.1 | 48.0 | 10.0 | 28.5 | 100 | 10 | 1 |
| | 38 | 0.22 | 0.76 | 0.01 | 0.01 | 4.4 | 0.8 | 80.0 | 3.8 | 11.0 | 100 | 10 | 1 |
| | 39 | 0.22 | 0.76 | 0.01 | 0.01 | 8.4 | 1.6 | 66.9 | 2.0 | 21.1 | 100 | 10 | 1 |
| | 40 | 0.22 | 0.76 | 0.01 | 0.01 | 7.6 | 1.4 | 60.1 | 12.0 | 18.9 | 100 | 10 | 1 |
| | 41 | 0.22 | 0.76 | 0.01 | 0.01 | 9.6 | 1.8 | 76.2 | 8.4 | 4.0 | 100 | 10 | 1 |
| | 42 | 0.22 | 0.76 | 0.01 | 0.01 | 6.5 | 1.2 | 51.6 | 5.7 | 35.0 | 100 | 10 | 1 |
| | 43 | 0.22 | 0.76 | 0.01 | 0.01 | 6.0 | 1.5 | 80.0 | 7.5 | 5.0 | 100 | 2 | 1 |
| | 44 | 0.22 | 0.76 | 0.01 | 0.01 | 6.0 | 1.5 | 80.0 | 7.5 | 5.0 | 100 | 40 | 1 |

TABLE 4

| | | εr | Q × f (GHz) | τf (ppm/°C.) | Sintering temp. °C. |
|---|---|---|---|---|---|
| Example | 15a | 20.0 | 10000 | 0 | 850 |
| | 15b | 20.0 | 10000 | 0 | 950 |
| | 16a | 19.3 | 10000 | −5 | 850 |
| | 16b | 19.3 | 10000 | −5 | 950 |
| | 17a | 17.7 | 9000 | −30 | 850 |
| | 17b | 17.7 | 9000 | −30 | 950 |
| | 18a | 17.0 | 9000 | −50 | 850 |
| | 18b | 17.0 | 9000 | −50 | 950 |
| | 19a | 20.0 | 10000 | −1 | 850 |
| | 19b | 20.0 | 10000 | −1 | 950 |
| | 20a | 22.1 | 12000 | 15 | 850 |
| | 20b | 22.1 | 12000 | 15 | 950 |
| | 21a | 24.5 | 13000 | 30 | 850 |
| | 21b | 24.5 | 13000 | 30 | 950 |
| | 22a | 20.0 | 10000 | 0 | 850 |
| | 22b | 20.0 | 10000 | 0 | 950 |
| | 23a | 19.0 | 8000 | 10 | 850 |
| | 23b | 19.0 | 8000 | 10 | 950 |
| | 24a | 17.5 | 6000 | 30 | 850 |
| | 24b | 17.5 | 6000 | 30 | 950 |
| | 25a | 18.5 | 13000 | −15 | 850 |
| | 25b | 18.5 | 13000 | −15 | 950 |
| | 26a | 19.5 | 13000 | −20 | 850 |
| | 26b | 19.5 | 13000 | −20 | 950 |
| | 27a | 18.0 | 12000 | −5 | 850 |
| | 27b | 18.0 | 12000 | −5 | 950 |
| | 28a | 16.0 | 8000 | −20 | 850 |
| | 28b | 16.0 | 8000 | −20 | 950 |
| | 29a | 22.0 | 13000 | 10 | 850 |
| | 29b | 22.0 | 13000 | 10 | 950 |
| | 30a | 18.0 | 7500 | −10 | 850 |
| | 30b | 18.0 | 7500 | −10 | 950 |
| Comp. Example | 22a | 23.5 | 12000 | 55 | 850 |
| | 22b | 23.5 | 12000 | 55 | 950 |
| | 23a | 16.5 | 6000 | −60 | 850 |
| | 23b | 16.5 | 6000 | −60 | 950 |
| | 24a | 26.0 | 13000 | 53 | 850 |
| | 24b | 26.0 | 13000 | 53 | 950 |
| | 25a | 42.0 | 14000 | 80 | 850 |
| | 25b | 42.0 | 14000 | 80 | 950 |
| | 26a | 20.0 | 10000 | −54 | 850 |
| | 26b | 20.0 | 10000 | 0 | 900 |
| | 26c | 20.0 | 10000 | 20 | 950 |
| | 27 | Not sintered at 1000° C. or lower | | | |
| | 28 | Not sintered at 1000° C. or lower | | | |
| | 29 | Glass was eluted at 800° C. or lower | | | |
| | 30 | Glass was eluted at 800° C. or lower | | | |
| | 31 | Not sintered at 1000° C. or lower | | | |
| | 32 | Not sintered at 1000° C. or lower | | | |
| | 33 | Not sintered at 1000° C. or lower | | | |
| | 34 | Not sintered at 1000° C. or lower | | | |
| | 35 | Melted in 4 wt. % sulfuric acid solution | | | |
| | 36 | Not sintered at 1000° C. or lower | | | |
| | 37 | Not sintered at 1000° C. or lower | | | |
| | 38 | Not sintered at 1000° C. or lower | | | |
| | 39 | Not sintered at 1000° C. or lower | | | |
| | 40 | Not sintered at 1000° C. or lower | | | |
| | 41 | Not sintered at 1000° C. or lower | | | |
| | 42 | Glass was eluted at 800° C. or higher | | | |
| | 43 | Not sintered at 1000° C. or lower | | | |
| | 44 | Glass was eluted at 900° C. or higher | | | |

To 100 g of the mixture of the base material and the glass, 9 g of polyvinyl butyral as a binder, 6 g of dibutylphthalate as a plasticizer, and 60 g of toluene and 30 g of isopropyl alcohol both as a solvent were added to prepare a green sheet having a thickness of 100 μm, according to the doctor blade method. Then, 22 layers of the green sheets were laminated by the thermo compression bonding of applying a pressure of 200 kg/cm$^2$ at a temperature of 65° C. At this time, a layer having been printed with Ag as an internal electrode was positioned such that it was provided at the center in the thickness direction. After sintering the obtained laminate at 900° C. for 2 hours, an external electrode was formed to prepare a tri-plate type resonator. The resonator had a size of 4.9 mm in width, 1.7 mm in height, and 8.4 mm in length.

The obtained tri-plate type resonator was evaluated on the no-loaded Q-value at a resonant frequency of 2 GHz. As a result, the no-loaded Q-value of the tri-plate type resonator was 210. Thus, it was possible to obtain a tri-plate type resonator having an excellent characteristic by using the dielectric ceramic composition according to the present invention.

Examples 16 to 18

Examples Belonging to the Second Embodiment

Influence of x and y

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass at the ratio also shown in Table 3. Then, sintered pellets were prepared under the same conditions as in the example 15, and were evaluated on various characteristics in the same method as in the example 15. The results thereof are shown in Table 4.

Examples 19 to 21

Examples Belonging to the Second Embodiment

Influence of z

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass at the ratio also shown in Table 3. Then, sintered pellets were prepared under the same conditions as in the example 15, and were evaluated on various characteristics in the same method as in the example 15. The results thereof are shown in Table 4.

Examples 22 to 24

Examples Belonging to the Second Embodiment

Influence of w

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass at the ratio also shown in Table 3. Then, sintered pellets were prepared under the same conditions as in the example 15, and were evaluated on various characteristics in the same method as in the example 15. The results thereof are shown in Table 4. It can be seen that the dielectric ceramic composition of the present invention containing $Al_2O_3$ as in these examples provides stable characteristics of appropriate relative dielectric constant, less dielectric loss (a high Q-value) and less variation of temperature coefficient $\tau_f$ of resonant frequency when sintered in a wide range of the sintering temperature of 850 to 950° C.

Examples 25 to 28

Examples Belonging to the Second Embodiment

Influence of the Glass Composition

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass of various compositions at the ratio also shown in Table 3, and the resultant was pulverized until the grain diameter thereof became the average grain diameters shown in Table 3. Then, sintered pellets were prepared under the same conditions as in the example 15, and were evaluated on various characteristics in the same method as in the example 15. The results thereof are shown in Table 4.

Examples 29 and 30

Examples Belonging to the Second Embodiment

Influence of the Glass Amount

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass at the ratio also shown in Table 3. Then, sintered pellets were prepared under the same conditions as in the example 15, and were evaluated on various characteristics in the same method as in the example 15. The results thereof are shown in Table 4.

Comparative Examples 22 and 23

Influence of x and y

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass at the ratio also shown in Table 3. Then, sintered pellets were prepared under the same conditions as in the example 15. However, when the molar ratio x of $Zn_2TiO_4$ was equal to or smaller than 0.15 or the molar ratio y of $ZnTiO_3$ was equal to or greater than 0.85, the temperature coefficient $\tau_f$ of resonant frequency was greater than +50 ppm/° C. When y was equal to 0, the temperature coefficient $\tau_f$ of resonant frequency was smaller than −50 ppm/° C. The results thereof are shown in Table 4.

Comparative Examples 24 and 25

Influence of z

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass at the ratio also shown in Table 3. Then, sintered pellets were prepared under the same conditions as in the example 15. However, when the molar ratio z of $TiO_2$ was greater than 0.2, the temperature coefficient $\tau_f$ of resonant frequency was greater than +50 ppm/° C. The results thereof are shown in Table 4.

Comparative Examples 26 and 27

Influence of w

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass at the ratio also shown in Table 3. Then, sintered pellets were prepared under the same conditions (sintering temperature of 900° C. was additionally conducted) as in the example 15. However, when the molar ratio w of $Al_2O_3$ was equal to 0, the absolute value of the temperature coefficient $\tau_f$ of resonant frequency was greater than 50 ppm/° C. in case of sintering temperature of 850° C., and the temperature coefficient $\tau_f$ of resonant frequency was unstably and greatly varied in a range of sintering temperature of 850 to 950° C. When w was equal to or higher than 0.2, the sintering temperature was equal to or higher than 1000° C. The results thereof are shown in Table 4.

Comparative Examples 28 to 42

Influence of the Glass Composition

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass of various compositions at the ratio also shown in Table 3. Then, sintered pellets were prepared under the same conditions as in the example 15. However, when glass compositions which are out of the range of the glass compositions adopted in the present invention were used, glass was melted by a sulfuric acid solution (Comparative Example 35), or the pellets could not be sintered at 1000° C. or lower, or glass was eluted at 800° C. or higher (Comparative Examples 28 to 34 or 36 to 42. The results thereof are shown in Table 4.

Comparative Examples 43 and 44

Influence of the Glass Amount

In the same manner as in the example 15 described above, mixtures of $Zn_2TiO_4$, $ZnTiO_3$, $TiO_2$ and $Al_2O_3$ mixed at ratios shown in Table 3 were used as base materials. These base materials were mixed with glass at the ratio also shown in Table 3. Then, sintered pellets were prepared under the same conditions as in the example 15. However, when the glass amount was smaller than 3 parts by weight, sintering could not be achieved at 1000° C. or lower. When the glass amount is greater than 30 parts by weight, glass was eluted at 900° C., and reacted with a setter. The results thereof are shown in Table 4.

INDUSTRIAL APPLICABILITY

The dielectric ceramic composition of the present invention enables sintering at a temperature equal to or lower than the melting point of Ag or Cu or alloy containing, as a major component, Ag or Cu, which has been difficult in conventional techniques. Therefore, according to the dielectric ceramic composition of the present invention, such a metal can be used as material of the internal conductor in internal packaging and multi-lamination thereof when manufacturing electronic parts. The dielectric ceramics obtained by sintering the dielectric ceramic composition of the present invention have a relative dielectric constant of about 10 to 40, preferably about 15 to 25, less dielectric loss tan δ (a high Q-value) and an absolute value in temperature coefficient $\tau_f$ of resonant frequency of 50 ppm/° C. or less. According to the present invention, there are provided a dielectric ceramic composition and manufacturing method for obtaining such dielectric ceramics, especially the dielectric ceramic composition and manufacturing method which cause less characteristic changes and variants caused by changes in sintering temperature and causes less changes in composition at the time of sintering. Furthermore, according to the present invention, there is provided a laminated ceramic part such as a laminated ceramic condenser or an LC filter that has a dielectric layer made of such a dielectric ceramic composition as described above and an inner electrode containing Ag or Cu or alloy containing, as a major component, Ag or Cu.

What is claimed is:

1. A dielectric ceramic composition containing:
   100 parts by weight of a major component expressed by a general formula of $x'Zn_2TiO_4$-$(1-x'-y')ZnTiO_3$-$y'TiO_2$ where x' satisfies 0.15<x'<0.8 and y' satisfies 0≦y'≦0.2; and
   3 to 30 parts by weight of lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %.

2. Dielectric ceramics containing crystalline phases of $Zn_2TiO_4$, $ZnTiO_3$ and $TiO_2$ (where the $TiO_2$ phase may be omitted) and a glass phase, which are obtained by sintering the dielectric ceramic composition as claimed in claim 1.

3. A method of manufacturing the dielectric ceramic composition as claimed in claim 1, comprising the steps of:
   mixing powder of raw material of ZnO and powder of raw material of $TiO_2$ and calcining them to obtain ceramic powder containing $Zn_2TiO_4$, $ZnTiO_3$ and $TiO_2$ (where the content of $TiO_2$ may be zero); and
   mixing the ceramic powder with lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %.

4. A laminated ceramic part comprising:
   plural dielectric layers;
   an internal electrode formed between the dielectric layers; and
   an external electrode electrically connected to the internal electrode,
   wherein the dielectric layers are constituted by dielectric ceramics obtained by sintering the dielectric ceramic composition as claimed in claim 1, and the internal electrode is made of elemental Cu or elemental Ag or alloy material containing Cu or Ag as a major component.

5. A dielectric ceramic composition containing:
   100 parts by weight of a major component expressed by a general formula of $xZn_2TiO_4$-$yZnTiO_3$-$zTiO_2$-$wAl_2O_3$ where x satisfies 0.15<x<1.0, y satisfies 0<y<0.85, z satisfies 0≦z≦0.2, w satisfies 0<w≦0.2, and x+y+z+w=1 is satisfied; and
   3 to 30 parts by weight of lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %.

6. Dielectric ceramics containing crystalline phases of $Zn_2TiO_4$, $ZnTiO_3$, $TiO_2$ and $Al_2O_3$ (where the $TiO_2$ phase may be omitted) and a glass phase, which are obtained by sintering the dielectric ceramic composition as claimed in claim 5.

7. A method of manufacturing the dielectric ceramic composition as claimed in claim 5, comprising the steps of:
   mixing powder of raw material of ZnO and powder of raw material of $TiO_2$ and calcining them to obtain ceramic powder containing $Zn_2TiO_4$, $ZnTiO_3$ and $TiO_2$ (where the content of $TiO_2$ may be zero); and
   mixing the ceramic powder with $Al_2O_3$ and lead-free low-melting glass containing ZnO at 50 to 75 wt %, $B_2O_3$ at 5 to 30 wt %, $SiO_2$ at 6 to 15 wt %, $Al_2O_3$ at 0.5 to 5 wt %, and BaO at 3 to 10 wt %.

8. A laminated ceramic part comprising:
   plural dielectric layers;
   an internal electrode formed between the dielectric layers; and
   an external electrode electrically connected to the internal electrode,
   wherein the dielectric layers are constituted by dielectric ceramics obtained by sintering the dielectric ceramic composition as claimed in claim 5, and the internal electrode is made of elemental Cu or elemental Ag or alloy material containing Cu or Ag as a major component.

\* \* \* \* \*